3,064,018
FAT AND OIL EXTRACTION PROCESS
Carlos Verrando Bruera, Calle San Jose 358, Lima, Peru
Filed Feb. 27, 1959, Ser. No. 795,951
1 Claim. (Cl. 260—412.4)

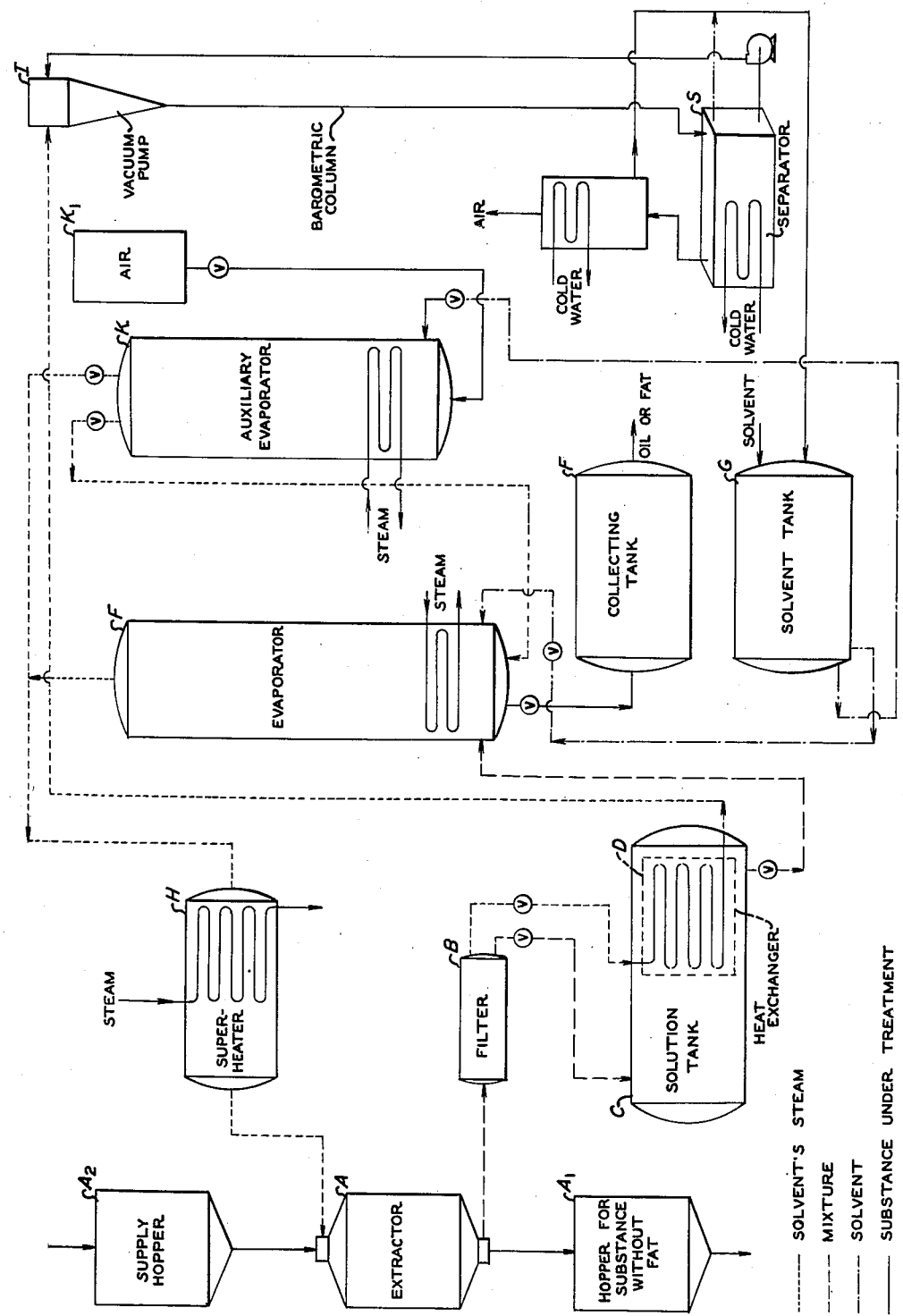

This invention relates to extraction processes and apparatus, and more particularly to methods and devices for processing substances to extract oils and/or fats therefrom.

The extraction of fats and oils has heretofore been generally effected by means of washing fat and oil containing substances with a suitable liquid solvent until the desired concentration of the resulting solution is obtained.

This solution is then treated in evaporators and condensers which respectively separate the solvent in vapor form from the solution and convert the vapor back to liquid form for reuse in the extraction process.

An object of the invention is to provide an improved process involving the direct use of solvent vapor or steam provided in a closed circuit and applied to substances containing oils or fats, which substances themselves act as condensers. When the solvent steam is condensed on the matter to be treated, its temperature is raised and the cells of the matter are opened to yield readily their fats or oils. A solution or mixture is thus formed which falls due to gravity and which may be purged from the substance by means of excess solvent steams to obtain, in a single pass, the complete and efficient extraction of the oils and fats.

According to a feature of the invention, the process uses the condensation heat of the solvent for extraction purposes instead of wasting the same as in known processes.

An additional advantage of the invention is that a large percentage of the heat is recovered from the condensation and drying steps by which is achieved a raising of operational temperatures to accelerate the process whereby the latter is effected with extreme efficiency.

The amount of solvent used in the improved method is substantially less than when liquid solvent is used, and the recovery is much more efficient. The process permits the extraction of oils and fats from substances such as fish meal, fine powders of rice, and so forth, which are very easily conglomerated and muddied.

This process further advantageously effects a deodorization during treatment.

A preferred embodiment of the invention, which is described in detail below, is illustrated by the accompanying drawing in which the sole figure is a diagrammatic view of the apparatus employed.

The substance on which the extraction operation is to be performed is enclosed in an extractor or container A. This substance may be, for example, fish meal, rice powder and so forth as will be indicated in greater detail; the substance is crushed, comminuted, pulverized, crumbled or otherwise conventionally prepared as desired. The extractor is evacuated along with the remainder of the system which comprises a filter B, a tank C, a heat exchanger D, an evaporator F, an auxiliary evaporator K and a superheater H. When the tank C contains a solution from a previous extraction, it is isolated and generally evacuated only for the first extraction or if otherwise needed.

The entire system is evacuated down to a pressure of about 126 mm. Hg (absolute). At the same time, the mixture which is awaiting in tank C is passed to evaporator F, and any required solvent is added. Then evaporator F is heated to produce steam from the solvent which is to be condensed directly on the matter to be treated in extractor A.

In extractor A the substance being treated condenses, on and within itself, the evaporized solvent, thus performing the functions of a condenser. The temperature of the substance is raised until equal to that of the condensation temperature of the solvent used and in dependence on the pressure in the extractor.

When the temperature of the substance is raised, the oil or fat contained in its cells emerges readily and, therefore, a very efficient and complete extraction is effected with a complete dissolving of the fats and oils.

The resulting solution or mixture of liquid and fats or oils is a precipitation which, due to gravity, falls continuously to the bottom of the extractor aided and abetted in this movement by the excess solvent vapors, thus dragging along all of the extractable fats and oils.

For solutions leaving the extractor A, there is provided the filter B, of conventional type, which blocks off the solid substances. The filtered solution is collected in tank C.

When the extraction is finished and when the substance under treatment has reached the condensation temperature, the substance is further heated by vapor received from the superheater H and by the vapor the evaporator F continues to produce. By means of this excess vapor, the mixture of solvent and fat is urged through the filter B to the tank C and there it is kept awaiting the next extraction operation.

The solid substance is thus drained off and heated and, for drying the same, the tank C is closed and separated from the circuit. The extractor A is connected to vacuum pump I through the heat exchanger D and in this way practically all of the solvent remaining in the extractor A is evaporated.

The above mentioned solvent, which is evacuated by the vacuum pump I, is condensed by it and is transferred to the solvent tank G for further use.

In order to use a part of the heat liberated in the condensation and that employed in the draining off and drying operation, the heat exchanger D (inside of the tank C) through which the steam is sucked by the vacuum pump, raises the temperature of the solution in the tank C to near the boiling point of the solvent.

To exhaust even more of the solvent contained both in the substance and in solution with the oil or fat already extracted, there is provided an auxiliary evaporator K, which injects (directly by its own pressure or by means of a Venturi tube) solvent steam, either superheated or not, into the lower part of the evaporator F, agitating and heating the solution therein. This steam drags solvent through the superheater H back into the extractor A and continues to process the substance under treatment before being evacuated by the vacuum pump.

When the solvent in the auxiliary evaporator K has been exhausted and the solvent has been separated from the oil in the evaporator F, the introduction of solvent steam into the evaporator F is terminated and air is passed from source $K_1$ to the auxiliary evaporator K. Evaporator K heats this air which is still further heated by the superheater H. The air passes through the treated matter, removing further of the solvent and executing a deodorizing function.

All air and steam, which is evacuated by the vacuum pump 1, is passed through a chamber or separator S which is cooled to remove the condensible content thereof and to remove the air.

When the drying is finished, air is admitted to the system and the substance previously exhausted of oil or fat is removed to hopper $A_1$. From the evaporator F, the oil or fat extracted in the previous cycle and liberated of solvent is transferred to collecting tank E.

Another extraction cycle may then be started with the extractor A being filled again with substance from supply hopper $A_2$. Air is again extracted from the circuit, and the solution is passed, still heated, from the tank C to the evaporator F where, with heating, the steam is produced which is necessary for this cycle.

The solvent, which is being consumed or that necessary for the evaporation, is added to the evaporator F and the auxiliary evaporator K from the tank G in which it is stored during drying, the solvent coming from the condensation in the cooling device and from the barometric column or vacuum pump.

The heat not retained by means of the heat exchanger D is removed through the vacuum pump with the steam extracted in the drying.

The vaporization, the overheating, the vacuum, the exchange of heat, the production of cold and utilization thereof and the elimination of the heat in excess, are effected by means of conventional devices. The devices constituting the system should be protected against loss of heat for a good operation and savings.

The simplest system has been described, but several extractors can be put into operation, as well as several filters, mixture tanks, evaporators, overheaters, heat exchangers and coolers to work in series. While a part of the multiple installation is functioning to change the material and for extraction, the other part functions for the draining off and drying. Also it is possible to employ other combinations between the four main phases of the system; that is: change of material, extraction, draining off and drying; thus obtaining a working which is practically continuous, with changes which may be made automatically.

The temperature of extraction changes in accordance with the solvent used and the absolute pressure existing in the extractor. By changing the pressure of the solvent steam and/or the effect of vacuum pump, the temperature of extraction can be changed at will and in accordance with the substance to be treated.

The solvent can be any substance suitable for dissolving fats and oils. Specifically, there may be employed hexane ($C_6H_{14}$) with a mol weight of 86.17, density 0.660, boiling point 69° C. and commercial mixtures thereof, the density of which may reach 0.750 and the boiling point of which is comprised approximately between 67° C. and 85° C.; trichlorethylene ($C_2HCl_3$) with a mol weight of 131.3, density of 1.470, and boiling point of 87° C.; and carbon disulphide ($CS_2$) with a mol weight of 76, density of 1.263, and a boiling point of 46° C.

Examples of vegetable substances containing oils or fats include, amongst the edible items, cottonseeds, peanuts, sunflower seeds, sesame, and cakes produced by previous extraction of oils by means of presses or expellers, and fine powders of rice (that is, the products obtained by hulling, cleaning and polishing rice).

Amongst the non-edible substances are pomace or higuerilla cake, flaxseed and other plants giving drying oils. Amongst substances of animal origin are fish meals and various other substances previously dried.

The temperatures between which the extraction may be effected are only limited by the condensation temperature of each solvent at the working pressure which is preferably between half and 4 times atmospheric pressure. The recommended upper limit is the maximum temperature that the matter and the oils and fats can endure without impairing their qualities. These temperatures may be, for example, between 30° C. and 120° C.

The amount of solvent to be used in each extraction varies according to the solvent and the matter to be treated, but preferably the solvent is used in proportion by weight of three to five quarters of the material treated.

What is claimed is:

A process for extracting oils and fats from animal and vegetable fatty substances containing the same, said method comprising loading said substance into a hermetically sealed zone, evacuating the zone to purge said substance of air and moisture, applying to the thusly prepared substance an organic solvent vapor and condensing a portion of the vapor on and in said substance, the vapor being enabled to penetrate completely into said substance due to the prior purging of air and moisture therefrom, the thusly condensed vapor dissolving the fats and oils in said substance, raising the temperature of the resulting solution and of the material with an additional portion of said vapor, purging the substance of said solution by applying an additional amount of organic solvent vapor thereto, filtering said solution and draining the same into a separate zone, drawing vapor from said hermetically sealed zone and through the solution in said separate zone in heat exchange relationship with the solution in said separate zone, distilling the solvent from the solution, collecting the thusly separated fats and oils, and recycling the thusly separated solvent along with additional fresh solvent as a vapor to said hermetically sealed zone.

References Cited in the file of this patent

UNITED STATES PATENTS

| | | |
|---|---|---|
| 2,225,799 | Robinson | Dec. 24, 1940 |
| 2,616,908 | Colbeth | Nov. 4, 1952 |
| 2,618,560 | Leslie | Nov. 18, 1952 |
| 2,653,957 | Westergaard | Sept. 29, 1953 |
| 2,682,551 | Miller | June 29, 1954 |
| 2,686,192 | Bonotto | Aug. 19, 1954 |
| 2,695,304 | Barns | Nov. 23, 1954 |
| 2,703,274 | Giesse et al. | Mar. 1, 1955 |